(12) United States Patent
Kornfeld et al.

(10) Patent No.: US 10,216,652 B1
(45) Date of Patent: Feb. 26, 2019

(54) SPLIT TARGET DATA TRANSFER

(75) Inventors: Sergey Kornfeld, Waltham, MA (US); Lev Knopov, Brookline, MA (US); Vladislav Eremeev, St. Petersburg (RU); Igor Achkinazi, Northborough, MA (US); Luis O. Torres, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 992 days.

(21) Appl. No.: 13/537,614

(22) Filed: Jun. 29, 2012

(51) Int. Cl.
*G06F 13/14* (2006.01)
*G06F 12/0893* (2016.01)

(52) U.S. Cl.
CPC .......... *G06F 13/14* (2013.01); *G06F 12/0893* (2013.01)

(58) Field of Classification Search
CPC ............................ G06F 13/14; G06F 12/0893
USPC .................................................... 710/305
See application file for complete search history.

(56) References Cited

U.S. PATENT DOCUMENTS

| | | | |
|---|---|---|---|
| 5,206,939 A | | 4/1993 | Yanai et al. |
| 5,734,859 A | * | 3/1998 | Yorimitsu ........... G06F 11/1076 711/112 |
| 5,742,792 A | | 4/1998 | Yanai et al. |
| 5,778,394 A | | 7/1998 | Galtzur et al. |
| 5,845,147 A | | 12/1998 | Vishlitzky et al. |
| 5,857,208 A | | 1/1999 | Ofek |
| 6,418,488 B1 | * | 7/2002 | Chilton ................. G06F 3/0613 710/104 |
| 7,054,883 B2 | | 5/2006 | Meiri et al. |
| 2010/0174770 A1 | * | 7/2010 | Pandya .......................... 709/200 |
| 2010/0281201 A1 | * | 11/2010 | O'Brien .............. G06F 13/4027 710/308 |
| 2011/0191563 A1 | * | 8/2011 | Acedo ................... G06F 3/0605 711/166 |
| 2012/0151118 A1 | * | 6/2012 | Flynn et al. ...................... 711/6 |
| 2012/0233377 A1 | * | 9/2012 | Nomura et al. ................... 711/3 |
| 2013/0305086 A1 | * | 11/2013 | Yulizar ............ G11B 20/10527 714/6.3 |

OTHER PUBLICATIONS

U.S. Appl. No. 13/341,112, filed Dec. 30, 2011, Veprinsky et al.
U.S. Appl. No. 13/537,682, filed Jun. 29, 2012, Kornfeld et al.

* cited by examiner

*Primary Examiner* — Idriss N Alrobaye
*Assistant Examiner* — Brooke J Taylor
(74) *Attorney, Agent, or Firm* — Muirhead and Saturnelli, LLC

(57) ABSTRACT

Transferring data to an initiator includes providing a first target that exchanges commands and status with the initiator, providing a second target that exchanges commands and data with the first target and exchanges data with the initiator, the initiator providing a transfer command to the first target, the first target providing a transfer command to the second target, and in response to the transfer command received from the first target, the second target transferring data to the initiator. Data may be transferred to the initiator using RDMA. The second target may provide a status message to the first target indicating a result of transferring data. The first target may provide the status message to the initiator. The first target may be a host adaptor of a data storage array. The second target may be a flash memory. The initiator may be a host coupled to the data storage array.

16 Claims, 7 Drawing Sheets

SPLIT TARGET DATA TRANSFER

BACKGROUND OF THE INVENTION

1. Technical Field

This application relates to computer data storage arrays, and more particularly to the field of transferring data between data storage arrays.

2. Description of Related Art

Host processor systems may store and retrieve data using data storage arrays containing a plurality of host interface units (host adapters), disk drives, and disk interface units (disk adapters). Such data storage arrays are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the data storage array through a plurality of channels provided therewith. Host systems provide data and access control information through the channels to the data storage array and the data storage array provides data to the host systems also through the channels. The host systems do not address the disk drives of the data storage array directly, but rather, access what appears to the host systems as a plurality of logical disk units. The logical disk units may or may not correspond to the actual disk drives. Allowing multiple host systems to access the single data storage array allows the host systems to share data stored therein.

In some cases, it may be possible to improve the performance of a data storage array by replacing at least some of the disks with faster non-volatile memory devices, such as flash storage, also knows as solid state disk storage. However, even with faster storage, there still may be latencies associated with other components of the data storage array, including latencies corresponding to transferring data to global memory before the data is provided to the host adaptors and the hosts.

Accordingly, it is desirable to provide a data storage array that uses relatively fast non-volatile memory and overcomes latencies usually associated with data storage arrays.

SUMMARY OF THE INVENTION

According to the system described herein, providing access to a host for requested data in a data storage array includes transferring the requested data from a cache memory of the data storage array to either the host or a host adaptor if the requested data is in the cache memory, transferring the requested data from a relatively slow non-volatile memory of the data storage array to the cache memory and subsequently transferring the requested data from the cache memory to either the host or the host adaptor if the requested data is in the relatively slow non-volatile memory and transferring the requested data simultaneously to the cache and to either the host and the host adaptor if the requested data is stored in relatively fast non-volatile memory. Data may be transferred directly from the relatively fast non-volatile memory to the host. The relatively fast non-volatile memory may be controlled by the host adaptor. The relatively fast non-volatile memory may be provided internally or externally to the storage array. The relatively fast non-volatile memory may be coupled to an internal bus of the storage array. The relatively fast non-volatile memory may be flash memory. The relatively slow non-volatile memory may be disk memory.

According further to the system described herein, computer software, provided in a non-transitory computer-readable medium, provides access to a host for requested data in a data storage array. The software includes executable code that transfers the requested data from a cache memory of the data storage array to one of: the host and a host adaptor if the requested data is in the cache memory, executable code that transfers the requested data from a relatively slow non-volatile memory of the data storage array to the cache memory and subsequently transferring the requested data from the cache memory to wither the host or the host adaptor if the requested data is in the relatively slow non-volatile memory and executable code that transfers the requested data simultaneously to the cache and to either the host and the host adaptor if the requested data is stored in relatively fast non-volatile memory. Data may be transferred directly from the relatively fast non-volatile memory to the host. The executable code that transfers data from the relatively fast non-volatile memory may be provided by the host adaptor. The relatively fast non-volatile memory may be flash memory. The relatively slow non-volatile memory is disk memory.

According further to the system described herein, a data storage array includes a global memory that stores cache data, a relatively fast non-volatile memory coupled to the global memory, a plurality of disk adaptor units coupled to the coupled to the global memory and the relatively fast non-volatile memory, relatively slow non-volatile memory coupled to the disk adaptor units and a plurality of host adaptors coupled to the global memory, the relatively fast non-volatile memory, and the disk adaptor units, at least one of the host adaptors providing requested data to a host, wherein the host adaptor units transfer the requested data from the cache memory to either the host or the host adaptor if the requested data is in the cache memory, transfers the requested data from a relatively slow non-volatile memory of the data storage array to the cache memory and subsequently transfers the requested data from the cache memory to either the host or the host adaptor if the requested data is in the relatively slow non-volatile memory and transfers the requested data simultaneously to the cache and to either the host or the host adaptor if the requested data is stored in relatively fast non-volatile memory. Data may be transferred directly from the relatively fast non-volatile memory to the host. The relatively fast non-volatile memory may be provided internally or externally to the storage array. The relatively fast non-volatile memory may be coupled to an internal bus of the storage array. The relatively fast non-volatile memory may be flash memory. The relatively slow non-volatile memory may be disk memory.

According further to the system described herein, transferring data to an initiator includes providing a first target that exchanges commands and status with the initiator, providing a second target that exchanges commands and data with the first target and exchanges data with the initiator, the initiator providing a transfer command to the first target, the first target providing a transfer command to the second target, and in response to the transfer command received from the first target, the second target transferring data to the initiator. Data may be transferred to the initiator using RDMA. The second target may provide a status message to the first target indicating a result of transferring data. The first target may provide the status message to the initiator. The first target may be a host adaptor of a data storage array. The second target may be a flash memory. The initiator may be a host coupled to the data storage array.

According further to the system described herein, computer software, provided in a non-transitory computer-readable medium, transfers data to an initiator. The software includes executable code that provides a transfer command from the initiator to a first target that exchanges commands and status with the initiator, executable code that provides a transfer command from the first target to the second target that exchanges commands and data with the first target and exchanges data with the initiator, and executable code that causes the second target to transfer data to the initiator in response to the second target receiving the transfer command from the first target. Data may be transferred to the initiator using RDMA. The second target may provide a status message to the first target indicating a result of transferring data. The software may also include executable code that causes the first target to provide the status message to the initiator. The first target may be a host adaptor of a data storage array that contains the executable code that provides a transfer command from the first target to the second target. The second target may be a flash memory. The initiator may be a host coupled to the data storage array that contains the executable code that provides a transfer command from the initiator to the first target.

DETAILED DESCRIPTION OF VARIOUS EMBODIMENTS

Figure 1:
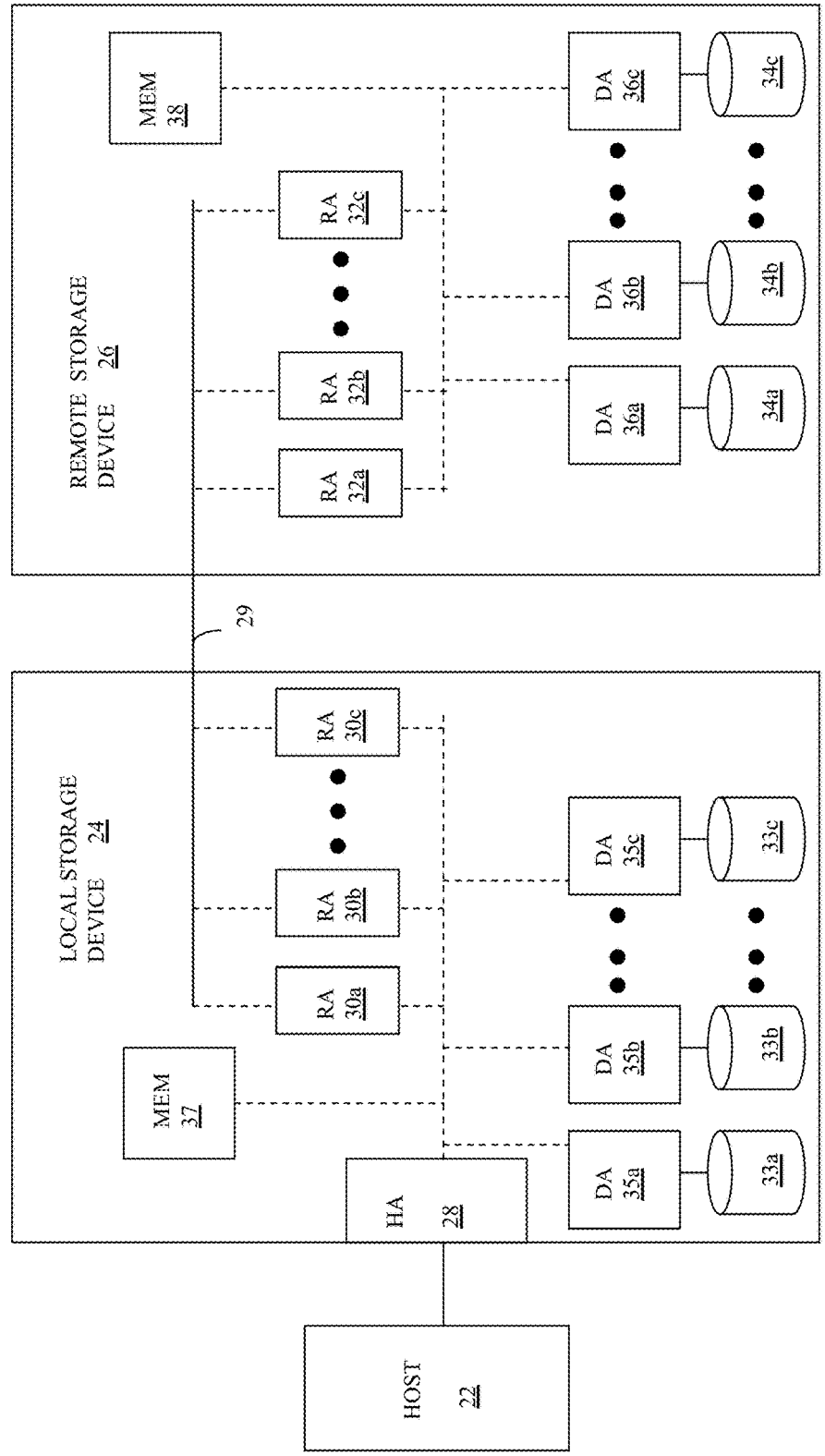
FIG. 1 is a schematic diagram showing a host, a local data storage array, and a remote data storage array used in connection with an embodiment of the system described herein.

Referring to FIG. 1, a diagram 20 shows a relationship between a host 22, a local data storage array 24, and a remote data storage array 26. The host 22 reads and writes data from and to the local data storage array 24 via a host adapter (HA) 28, which facilitates the interface between the host 22 and the local data storage array 24. Although the diagram 20 only shows one host 22 and one HA 28, it will be appreciated by one of ordinary skill in the art that multiple HA's may be used and that one or more HA's may have one or more hosts coupled thereto.

Data from the local data storage array 24 is copied to the remote data storage array 26 via a link 29 to cause the data on the remote data storage array 26 to be identical to the data on the local data storage array 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the data storage arrays 24, 26 and to have links between one or both of the data storage arrays 24, 26 and other data storage arrays (not shown). In addition, the link 29 may be provided using a direct connection (wired, over-the-air, or some combination thereof), a network (such as the Internet), or any other appropriate means for conveying data. Note that there may be a time delay between the transfer of data from the local data storage array 24 to the remote data storage array 26, so that the remote data storage array 26 may, at certain points in time, contain data that is not identical to the data on the local data storage array 24.

The local data storage array 24 includes a first plurality of RDF adapter units (RA's) 30a, 30b, 30c and the remote data storage array 26 includes a second plurality of RA's 32a-32c. The RA's 30a-30c, 32a-32c are coupled to the RDF link 29 and are similar to the host adapter 28, but are used to transfer data between the data storage arrays 24, 26. The software used in connection with the RA's 30a-30c, 32a-32c is discussed in more detail elsewhere herein.

The data storage arrays 24, 26 may include one or more disks, each containing a different portion of data stored on each of the data storage arrays 24, 26. FIG. 1 shows the data storage array 24 including a plurality of disks 33a, 33b, 33c and the data storage array 26 including a plurality of disks 34a, 34b, 34c. The remote data copying functionality described herein may be applied so that the data for at least a portion of the disks 33a-33c of the local data storage array 24 is copied, using RDF or a different mechanism, to at least a portion of the disks 34a-34c of the remote data storage array 26. It is possible that other data of the data storage arrays 24, 26 is not copied between the data storage arrays 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote data storage array 26 may be used to provide data to corresponding ones of the disks 34a-34c and receive data from corresponding ones of the disks 34a-34c. An internal data path exists between the DA's 35a-35c, the HA 28 and the RA's 30a-30c of the local data storage array 24. Similarly, an internal data path exists between the DA's 36a-36c and the RA's 32a-32c of the remote data storage array 26. Note that, in other embodiments, it is possible for more than one disk to be serviced by a DA and that it is possible for more than one DA to service a disk.

The local data storage array 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote data storage array 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local data storage array 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote data storage array 26 that comprises the disks 34a-34c may be subdivided into a plurality of volumes or logical devices, where each of the logical devices may or may not correspond to one or more of the disks 34a-34c. Other physical storage elements may be used for physical storage, such as flash drives.

Providing a mapping between portions of the local data storage array 24 and the remote data storage array 26 involves setting up a logical device on the remote data storage array 26 that is a remote mirror for a logical device on the local data storage array 24. The host 22 reads and writes data from and to the logical device on the local data storage array 24 and the mapping causes modified data to be transferred from the local data storage array 24 to the remote data storage array 26 using the RA's, 30a-30c, 32a-32c and the link 29. In steady state operation, the logical device on the remote data storage array 26 contains data that is identical to the data of the logical device on the local data storage array 24. When the RDF mechanism is used, the logical device on the local data storage array 24 that is accessed by the host 22 is referred to as the "R1 volume" (or just "R1") while the logical device on the remote data storage array 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
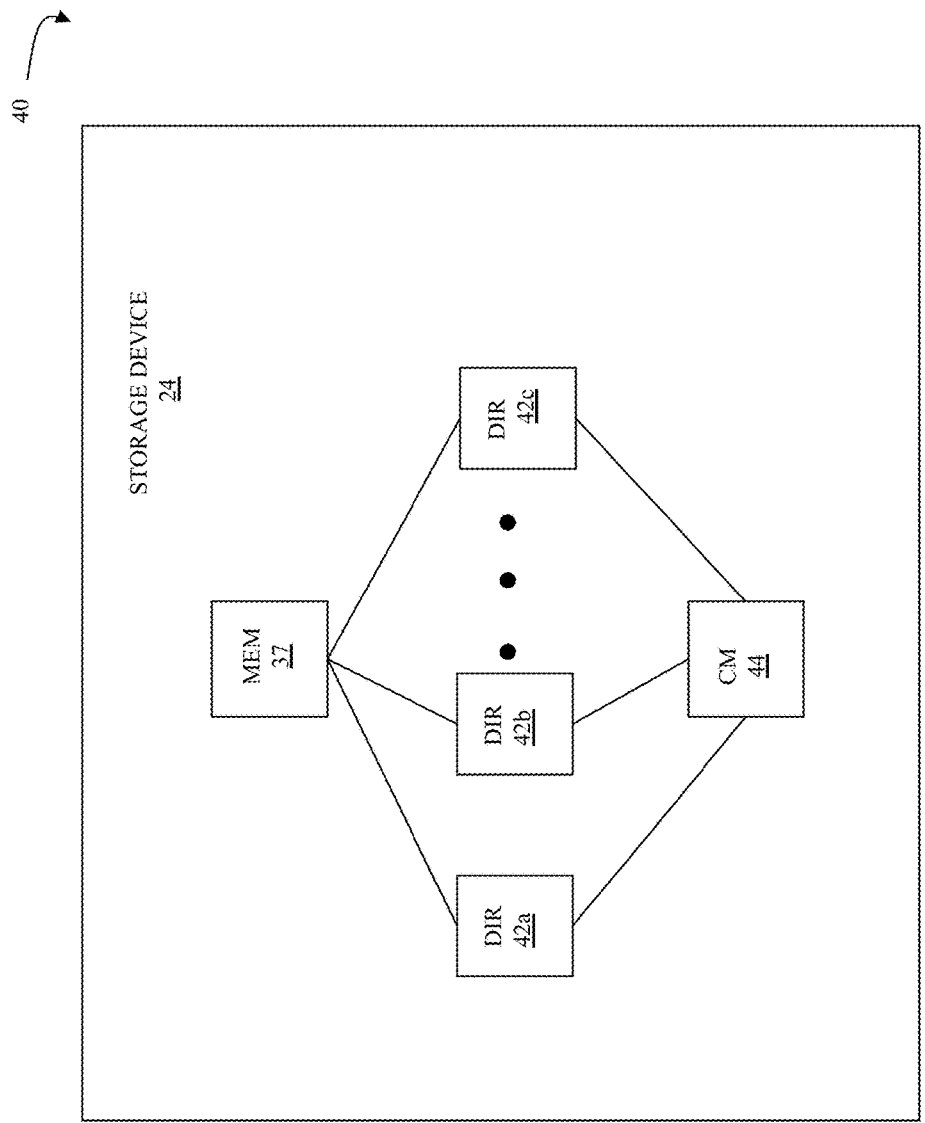
FIG. 2 is a schematic diagram showing a data storage array, memory, a plurality of directors, and a communication module that may be used in connection with an embodiment of the system described herein.

Referring to FIG. 2, a diagram 40 illustrates an embodiment of the data storage array 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific data storage array configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
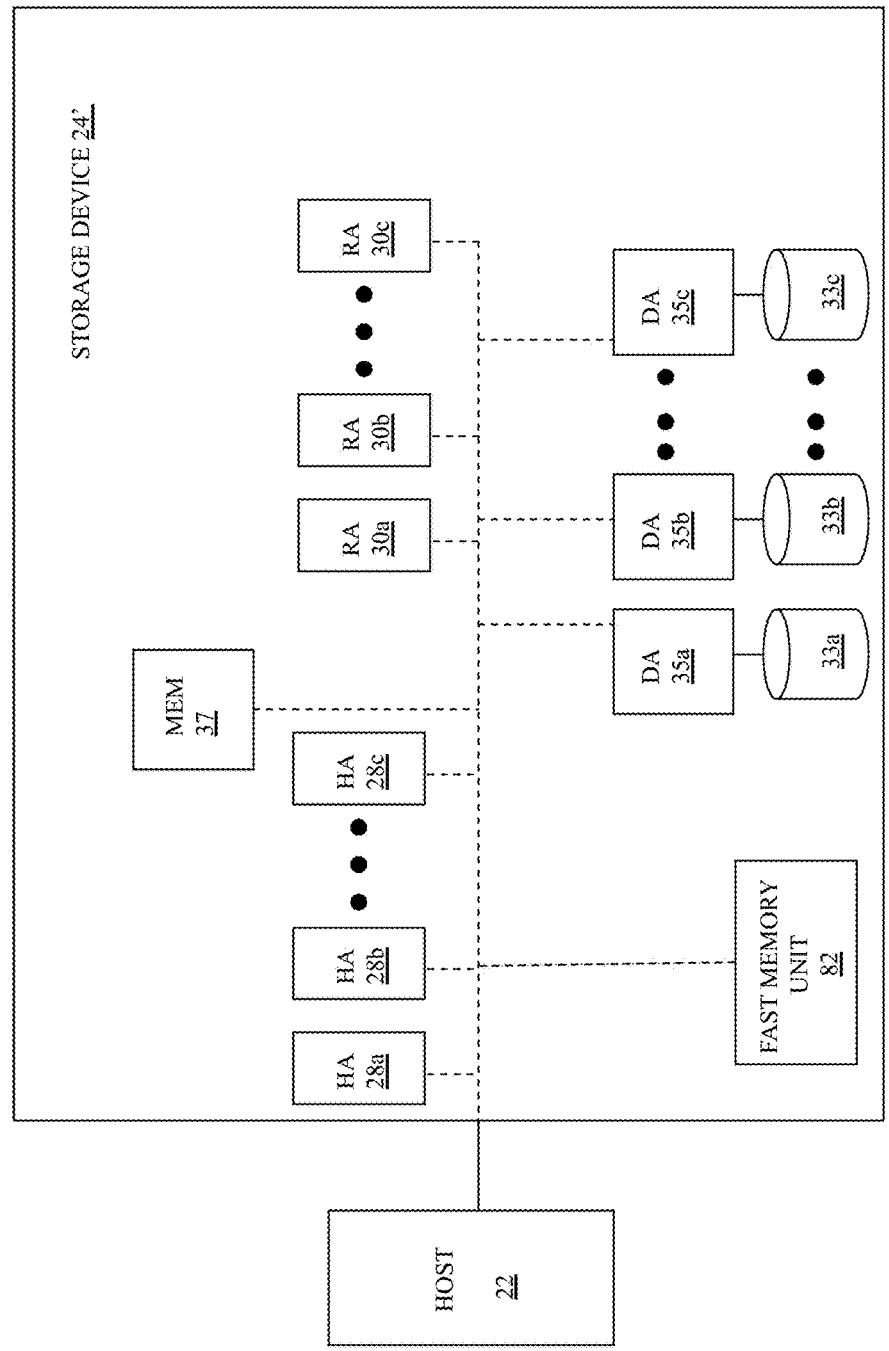
FIG. 3 is a schematic diagram showing a host and a data storage array with a fast memory unit according to an embodiment of the system described herein.

Referring to FIG. 3, a diagram 80 shows a data storage array 24' that is similar to the local data storage array 24 described elsewhere herein. The data storage device 24' shows a plurality of HAs 28a-28c. Note also that the host 22 is coupled to the bus of the storage device 24' instead of connecting to the storage device 24' through one of the HAs 28a-28c. However, the host 22 may still communicate with one of the HAs 28a-28c, which handles I/O operations between the host 22 and the storage device 24'.

Note that although the HAs 28a-28c, the RAs 30a-30c, and the DAs 35a-35c are shown in the diagram 80 as discrete components, it is understood that any of the components shown herein may be integrated in any way. Similarly, although the global memory 37 is shown as a single discrete component, it is understood that the global memory 37 may be physically distributed throughout the data storage array 24' and, in some cases, be part of one or more of the HAs 28a-28c, the RAs 30a-30c, and/or the DAs 35a-35c.

The data storage array 24' includes a fast memory unit 82 that provides non-volatile storage for the data that could otherwise be stored on one of the disks 33a-33c. However, the fast memory unit 82 is coupled to the bus of the data storage array 24'. The fast memory unit 82 communicates directly with the HAs 28a-28c to provide data to and from the host 22. Thus, unlike data from the disks 33a-33c, which is first transferred from the disks 33a-33c to a cache portion of the global memory 37 and then transferred to one of the HAs 28a-28c, data is transferred more quickly and more directly from the fast memory unit 82 to the HAs 28a-28c without first being provided in the global memory 37.

The fast memory unit 82 may be any type of storage. In an embodiment herein, the fast memory unit 82 is flash memory, also knows as solid state drive storage. For the system described herein, it is sufficient that the fast memory unit 82 is relatively faster than the disks 33a-33c and/or whatever storage is otherwise used for a data storage array containing the fast memory unit 82. Thus, the fast memory unit 82 represents relatively fast non-volatile memory while the disks 33a-33c represent relatively slow non-volatile memory. The fast memory unit 82 may use any protocol, such as the SCSI protocol, to exchange commands and data between the fast memory unit 82 and the bus of the storage device 24'. In an embodiment herein, the fast memory unit 82 may be controlled by one of the HAs 28a-28c, although it is possible to use other mechanisms to control the fast memory unit 82.

Figure 4:
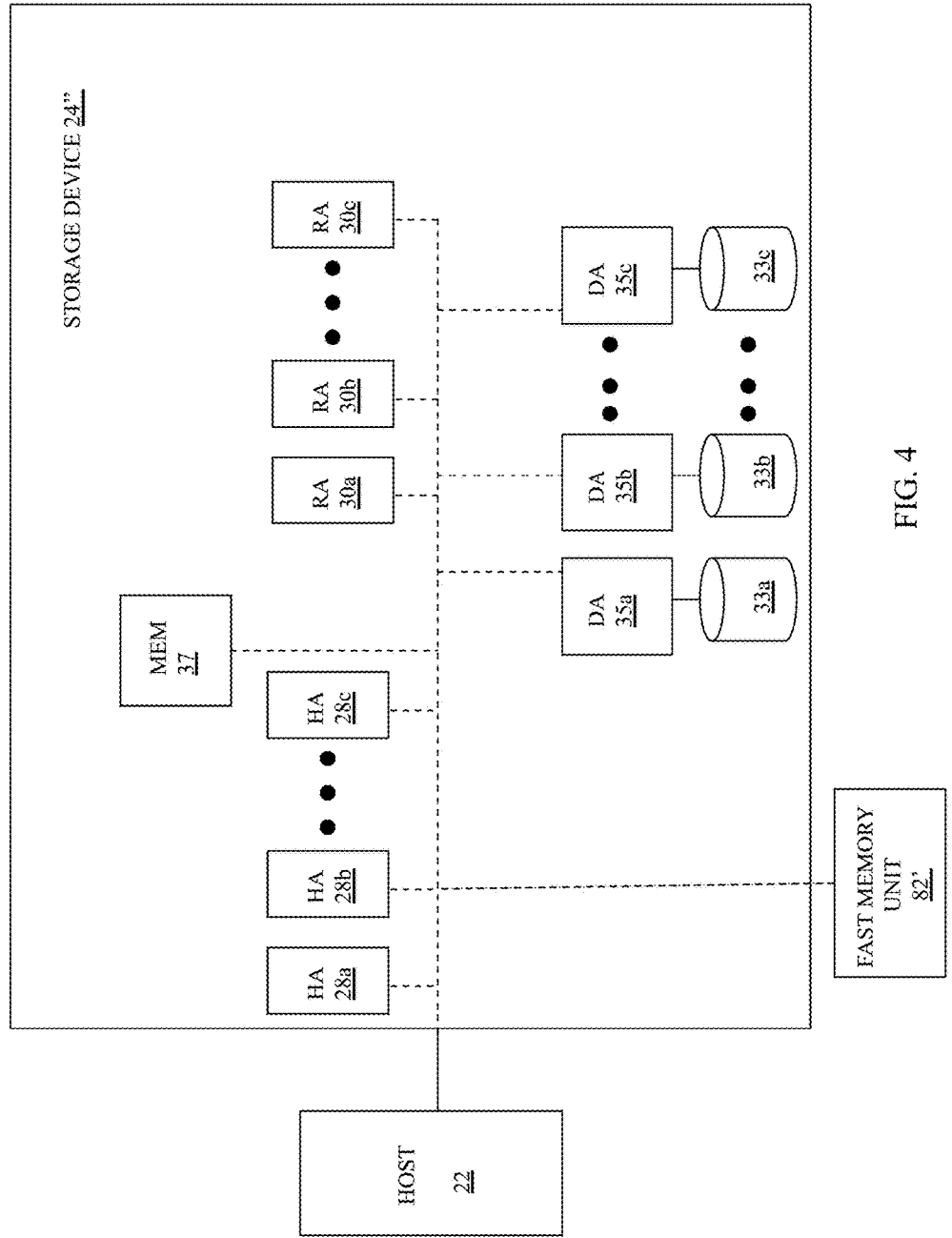
FIG. 4 is a schematic diagram showing a host and a data storage array with a fast memory unit according to another embodiment of the system described herein.

Referring to FIG. 4, a diagram 90 shows a data storage array 24" that is similar to the data storage array 24'. However, for the diagram 90, a fast memory unit 82' is located external data storage array 24". The fast memory unit 82' is like the fast memory unit 82 and communicates with the HAs 28a-28c to provide data to and from the host 22. The fast memory unit 82' may be coupled to the data storage array 24" using any appropriate connection mechanism, including infiniband, RDMA-capable ethernet, a SCSI connection, a direct connection to the internal bus of the data storage array 24", etc.

Figure 5:
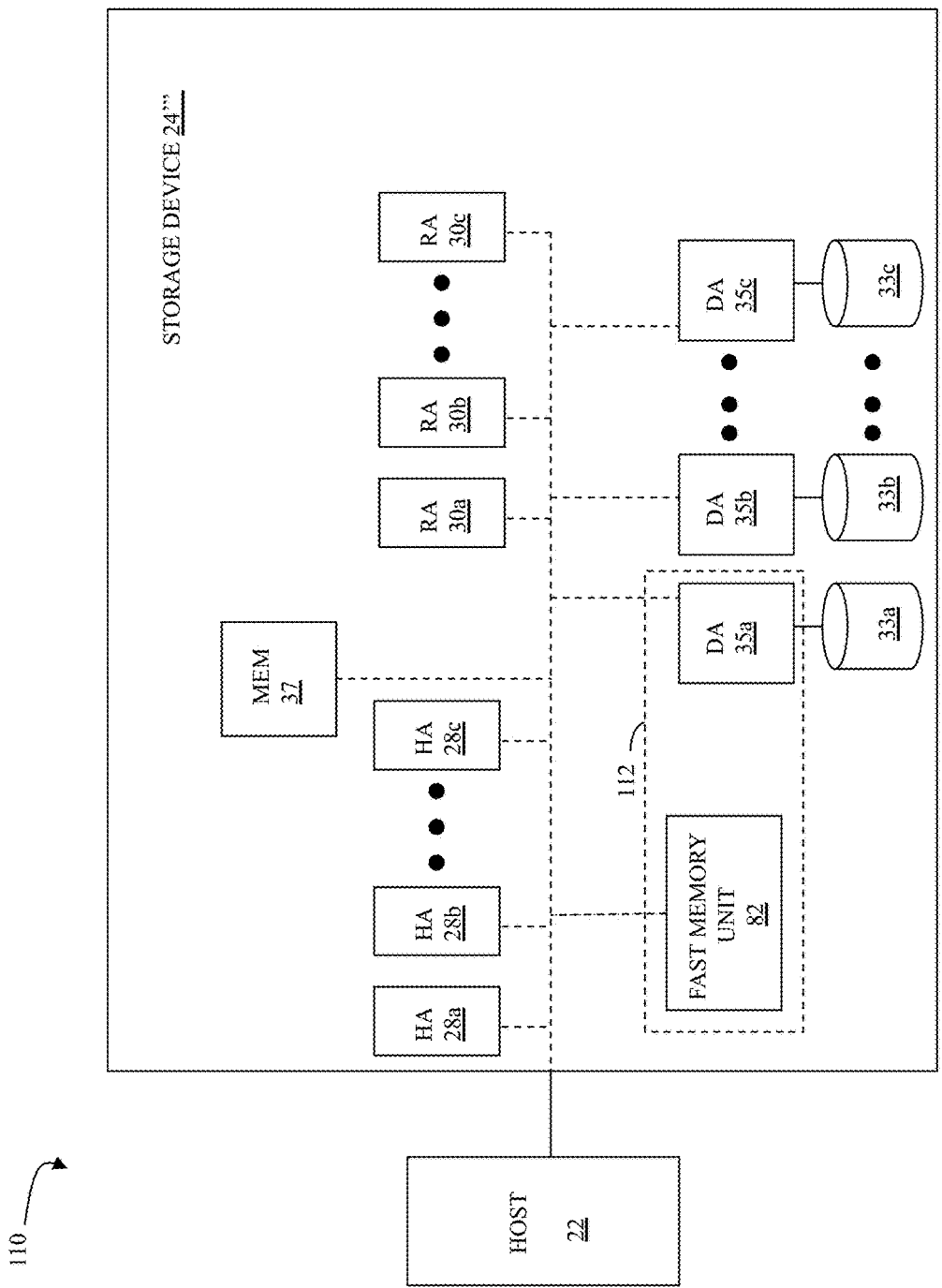
FIG. 5 is a schematic diagram showing a host and a data storage array with a fast memory according to another embodiment of the system described herein.

Referring to FIG. 5, a diagram 110 shows a data storage array 24''' that is like the data storage arrays 24', 24" discussed elsewhere herein. In the embodiment of FIG. 5, the fast memory unit 82 is not controlled by one of the HAs 28a-28c. Instead, the DA 35a handles control of the fast memory unit 82 in a manner similar to functionality provided one of the HAs 28a-28c, discussed elsewhere herein. The fast memory unit 82 and the DA 35a may form a functional unit 112.

Figure 6:
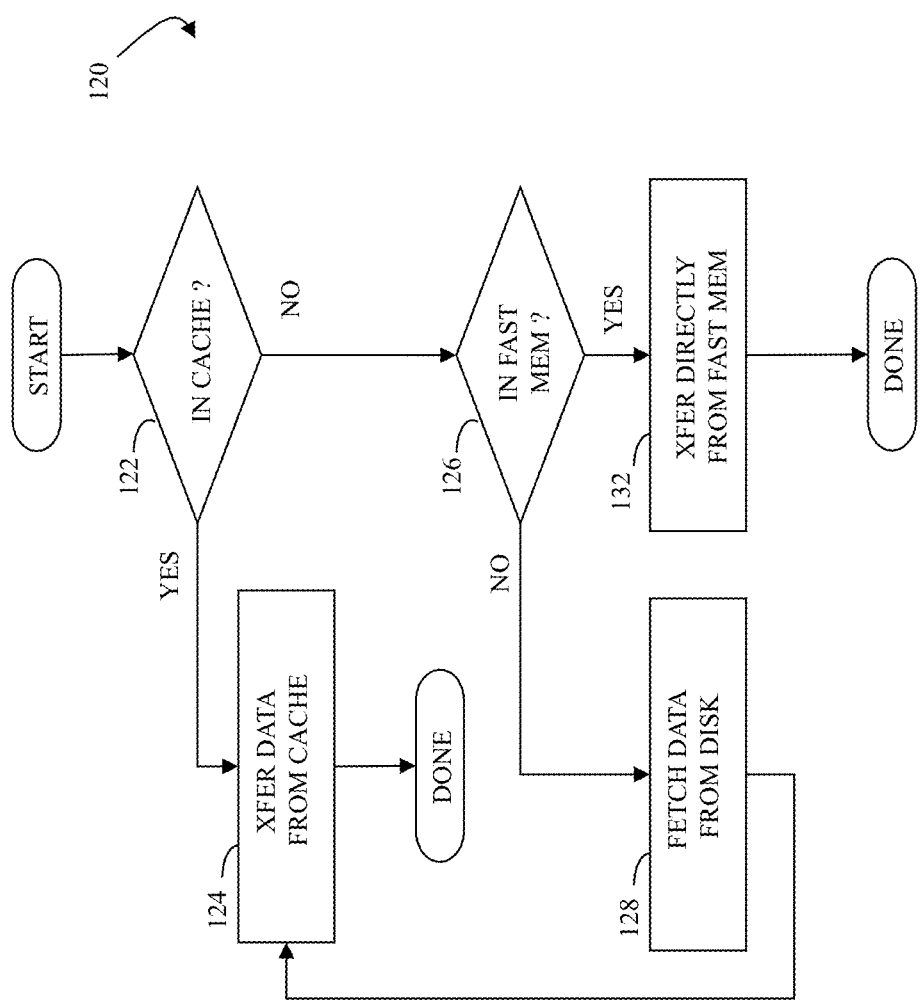
FIG. 6 is a flow diagram illustrating steps performed in connection with reading data from a data storage array according to an embodiment of the system described herein.

Referring to FIG. 6, a flow diagram 120 illustrates processing performed in connection with the host 22 reading data from a data storage array (e.g., one of the data storage arrays 24', 24", 24'''). Processing begins at a first test step 122 where it is determined if the data being read is already in the cache (global memory 37) of the data storage array. If so, then control transfers from the test step 122 to a step 124 where the data is transferred from the cache to the HA 28 and then to the host 22. Following the step 124, processing is complete.

If it is determined at the test step 122 that the requested data is not in the cache of the data storage array, then control transfers from the test step 122 to a test step 126 where it is determined if the data being read is in the fast memory (e.g., the fast memory 82, 82'). If not, then control transfers from the test step 126 to a step 128 where the requested data is fetched from a disk (e.g., one of the disks 33a-33c) by an appropriate one of the DAs 35a-35c. In an embodiment herein, data that is fetched from the disks is transferred from the disk to the cache memory. Following the step 128, control transfers to the step 124, discussed above, where the data is transferred from the cache. Following the step 124, processing is complete.

If it is determined at the test step 126 that the data being read is in the fast memory, then control transfers from the test step 126 to a step 132 where the requested data is transferred directly from the fast memory to both the cache and to one of the HAs 28a-28c. In some embodiments, the data may be transferred from the fast memory to the one of the HAs 28a-28c and then to the host 22. In other embodiments, discussed in more detail elsewhere herein, the data may be transferred from the fast memory directly to the host 22. The transfer at the step 132 may be in parallel so that data is transferred to the cache simultaneously with transferring the data to the host 22 or one of the HAs 28a-28c. Following the step 132, processing is complete.

Figure 7:
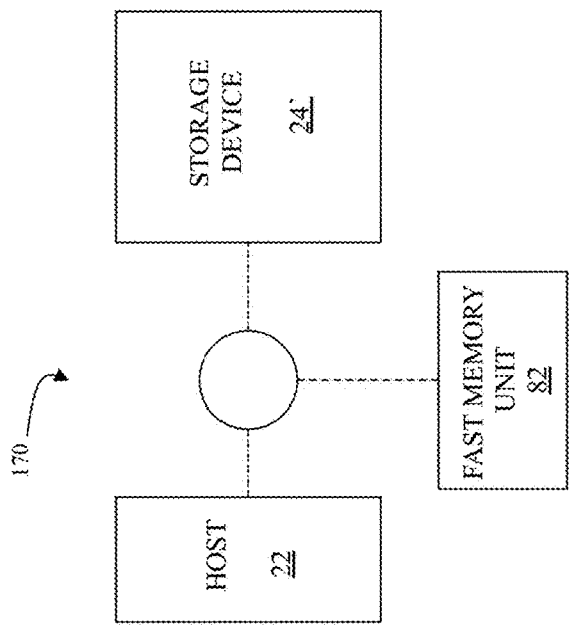
FIG. 7 is a schematic diagram showing logical connections between a host, a data storage device, and a fast memory unit according to an embodiment of the system described herein.

Referring to FIG. 7, a diagram 170 illustrates a logic coupling between the host 22, the storage device 24 and the fast memory unit 82. There is a logical data coupling directly between the host 22 and the storage device 24' and between the host 22 and the fast memory unit 82. For the host 22, the logical data path to the fast memory unit 82 appears comparable to the logical data path to the storage device 24' even though the fast memory unit 82 may be physically located within the storage device 24'. As described in more detail elsewhere herein, it may be possible to take advantage of the logical relationship between the host 22 and the fast memory unit 82.

Figure 8:
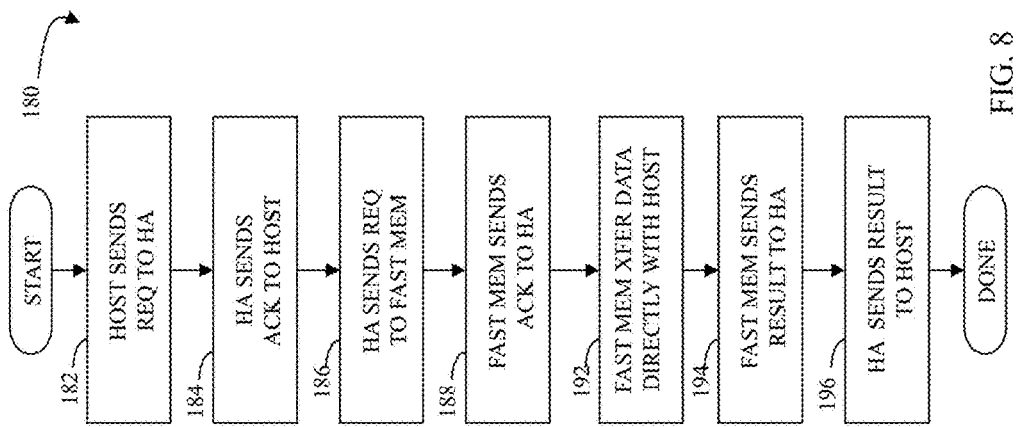
FIG. 8 is a flow diagram illustrating steps performed in connection with transferring data between a host and a fast memory unit according to an embodiment of the system described herein.

Referring to FIG. 8, a flow diagram 180 illustrates steps performed in connection with the host 22 transferring data directly with the fast memory unit 82 using the SCSI protocol. Of course, other protocols may be used. In the embodiment illustrated herein, the host 22 acts as a SCSI initiator and the fast memory unit 82, in combination with one of the HAs 28a-28c, acts as a SCSI target, although it is possible in other embodiments to reverse the roles and/or use a different protocol.

Processing begins at a first step 182 where the host 22 sends a SCSI request to one of the HAs 28a-28c. Following the step 182 is a step 184 where the one of the HAs 28a-28c acknowledges the request back to the host 22. Following the step 184 is a step 186 where the one of the HAs 28a-28c sends an RDMA (Remote Data Memory Access) request to the fast memory unit 82. In an embodiment herein, the fast memory unit 82 is configured to perform RDMA transfers. Following the step 186 is a step 188 where the fast memory 82 acknowledges, to the one of the HAs 28a-28c, the RDMA transfer request.

Following the step 188 is a step 192 where the fast memory unit 82 transfers data directly with the host 22. Following the step 192 is a step 194 where the fast memory unit 82 sends the result of the transfer (e.g., a status message indicating SUCCESS, FAIL, etc.) to the one of the HAs 28a-28c. Following the step 194 is a step 196 where the one of the HAs 28a-28c sends the result of the transfer (status message) to the host 22. Following the step 196, processing is complete.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more data storage arrays having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of transferring data to an initiator, comprising:
providing a first target that exchanges commands and status with the initiator, the first target including a data storage array having a cache memory, at least one storage device, and a host adaptor that is coupled to the initiator and communicates with the cache memory;
providing a second target, coupled to the host adaptor, that exchanges commands and data with the first target and exchanges data with the initiator, the second target including a fast memory unit having memory that is accessible faster than the at least one storage device of the data storage array, wherein at least some data is stored at only one of: the first target or the second target;
the initiator providing a first transfer command to the first target, the first transfer command including a request for requested data;
transferring the requested data from cache memory of the first target through the host adaptor to the initiator in response to the requested data being stored in the cache memory;
determining whether the requested data is stored in the faster memory unit of the second target in response to the requested data not being stored in the cache memory of the data storage array of the first target;
the first target providing a second transfer command to the second target in response to the requested data not being stored in the cache memory of the data storage array of the first target and being stored in the faster memory unit of the second target; and
in response to the second transfer command received from the first target, the second target transferring the requested data to the initiator through the host adaptor.

2. The method, according to claim 1, wherein the requested data is transferred to the initiator using RDMA.

3. The method, according to claim 1, wherein the second target provides a status message to the first target indicating a result of transferring the requested data.

4. The method, according to claim 3, wherein the first target provides the status message to the initiator.

5. The method, according to claim 1, wherein the first target includes a host adaptor of the data storage array.

6. The method, according to claim 5, wherein the fast memory unit of the second target is a flash memory.

7. The method, according to claim 6, wherein the initiator is a host coupled to the data storage array.

8. A non-transitory computer-readable medium storing software that, when executed by at least one processor, transfers data to an initiator, the software comprising:
executable code that provides a first transfer command from the initiator to a first target that exchanges commands and status with the initiator to provide a request for data, the first target including a data storage array having a cache memory, at least one storage device, and a host adaptor that is coupled to the initiator and communicates with the cache memory and a second target, coupled to the host adaptor, including a fast memory unit having memory that is accessible faster than the at least one storage device of the data storage array, wherein at least some data is stored at only one of: the first target or the second target;
executable code that transfers the requested data from cache memory of the first target through the host adaptor to the initiator in response to the requested data being stored in the cache memory;
executable code that determines whether the requested data is stored in the faster memory unit of the second target in response to the requested data not being stored in the cache memory of the data storage array of the first target;
executable code that provides a second transfer command from the first target to the second target that exchanges commands and data with the first target and exchanges data with the initiator in response to the requested data not being stored in the cache memory of the data storage array of the first target and being stored in the faster memory unit of the second target; and
executable code that causes the second target to transfer the requested data to the initiator in response to the second target receiving the second transfer command from the first target through the host adaptor.

9. The non-transitory computer-readable medium according to claim 8, wherein the requested data is transferred to the initiator using RDMA.

10. The non-transitory computer-readable medium according to claim 8, wherein the second target provides a status message to the first target indicating a result of transferring the requested data.

11. The non-transitory computer-readable medium according to claim 10, further comprising:
executable code that causes the first target to provide the status message to the initiator.

12. The non-transitory computer-readable medium according to claim 8, wherein the first target is a host adaptor of the data storage array that contains the executable code that provides the second transfer command from the first target to the second target.

13. The non-transitory computer-readable medium according to claim 12, wherein the fast memory unit of the second target includes a flash memory.

14. The non-transitory computer-readable medium according to claim 13, wherein the initiator is a host coupled to the data storage array that contains the executable code that provides the first transfer command from the initiator to the first target.

15. The non-transitory computer-readable medium according to claim 8, wherein, in response to the second transfer command received from the first target, the second target transfers the requested data to the initiator and to the cache memory of the data storage array of the first target.

16. The method according to claim 1, wherein, in response to the second transfer command received from the first target, the second target transfers the requested data to the initiator and to the cache memory of the data storage array of the first target.

\* \* \* \* \*